May 8, 1956 R. CLIBORN 2,744,773
SEAL
Filed March 23, 1951

Inventor
Robert Cliborn
by Hill, Sherman, Meroni, Gross & Simpson
Attys

United States Patent Office 2,744,773
Patented May 8, 1956

2,744,773

SEAL

Robert Cliborn, Cleveland, Ohio, assignor to Thompson Products, Inc., Cleveland, Ohio, a corporation of Ohio Application March 23, 1951, Serial No. 217,261

4 Claims. (Cl. 286—11.15)

This invention relates to a seal for use between two relatively rotating parts. Particularly, this invention deals with a shaft seal of the relatively rotating ring type wherein rotating carbon rings are urged into face engagement with stationary metal rings by a spring ring which is deflected under the influence of projecting ribs on the carbon rings.

The invention will hereinafter be specifically described as embodied in a double seal having two sets of rotating carbon rings, but it should be understood that the invention is not limited to double seals. The principles of the invention are generaly applicable to seals of the type having one or more groups of spring urged carbon rings engaging opposed metal rings.

In accordance with this invention, a casing houses a plurality of spaced metal rings having holes therethrough accommodating free passage of a shaft. In the spaces between the metal rings are mounted rotating carbon ring assemblies. Each carbon ring assembly includes split outer carbon packing rings in face engagement with the adjacent metal rings, split carbon seal rings between the packing rings having ribbed faces with the ribs projecting toward each other, a metal spring ring between the ribs and deflected thereby for urging the sealing rings against the packing rings and the packing rings against the metal rings, and an encircling band around all of the split carbon rings contracting the rings into tight engagement with an inserted shaft. When the shaft is rotated, the carbon ring assemblies will rotate therewith and the packing rings will ride on the stationary metal rings. Sealing contact between the packing rings and the metal rings is maintained by the spring ring while sealing contact between the carbon rings and the shaft is maintained by the encircling band. If desired, the metal band need not be so tight as to cause the carbon rings to fixedly grip the shaft, whereupon some slippage between the carbon rings and the shaft will occur. Likewise, the spring force of the spring ring can be controlled relative to the clamping force of the carbon rings on the shaft so that the rubbing velocity between the carbon and metal rings is controllable by the spring force and the amount of clamping action around the shaft by the carbon rings.

The seals of this invention can be prelubricated and lubricant can be easily sealed therein. Axial movement of the shaft is not restrained by the seals, since the clamping force can be such that the shaft can slide through the carbon rings.

It is, then, an object of this invention to provide a shaft seal of the relatively rotating ring type wherein a rotating carbon ring assembly is equipped with a distorted spring ring for maintaining the carbon rings of the assembly in sealing face to face engagement with opposed rings.

Another object of this invention is to provide a seal adapted to fit into restricted areas and having a loaded spring disk which not only coacts to hold a rotating seal ring in face to face sealing engagement with a stationary seal ring but also serves as a vibration dampener.

Another object of the invention is to provide a seal assembly wherein the rubbing velocity between coacting relative and stationary seal rings is controllable by the action of a spring disk and a clamping ring.

A further object of the invention is to provide a prelubricated shaft seal operable over a wide temperature range and containing no parts which are subject to deterioration from lubricant.

Another object of the invention is to provide a shaft seal of the relatively rotating seal ring type wherein a spring disk is deformed by ribs on a rotating seal ring and is thereby loaded to maintain the seal parts in sealing relationship.

Another and further object of the invention is to provide a seal of the relatively rotating ring type wherein a sleeve or clamping band is effective to hold the rotating rings on a shaft in sealing engagement therewith.

Other and further objects of this invention will be apparent to those skilled in the art from the following detailed description of the annexed sheet of drawings which, by way of a preferred example only, illustrates one embodiment of the invention.

Figure 1:
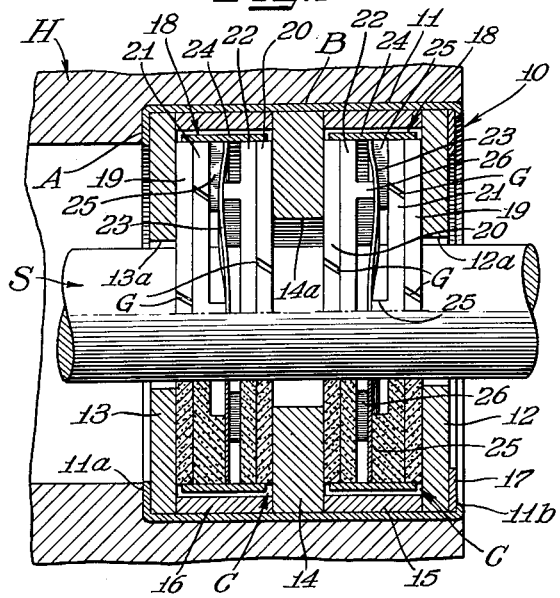
Figure 1 is a longitudinal cross-sectional view, with parts in side elevation, of a double shaft seal according to this invention illustrating the manner in which the seal is mounted in the recess of a housing and on a shaft.

The seal 10 of this invention is illustrated in Figure 1 as being mounted in a housing H and around a shaft S. The seal 10 has a cylindrical casing 11 pressed into a bore B of the housing and bottomed against an abutment shoulder A at the end of the bore. It should be appreciated that the casing 11 could be mounted in a housing in any other desired manner, and the illustrated mounting merely emphasizes the simplicity of positioning the seal of this invention in a housing containing a shaft.

Metal end ring plates 12 and 13 are respectively seated in opposite ends of the casing 11. A thicker metal ring separator plate 14 is mounted in the central portion of the casing 11. A first spacer sleeve 15 in the casing 11 separates the plate 12 from the plate 14 while a second sleeve 16 separates the plate 13 from the separator 14. These sleeves 15 and 16 engage the outer peripheral portions of the plates and separator and coact therewith to define local chambers C in the casing.

The inner end of the casing has an inturned flange 11a against which the end plate 13 is seated. The opposite end of the casing 11 receives a retainer ring 17 which is bottomed against the end plate 12 and is locked in the casing by a spun in rim flange 11b overlying the outer face of the retainer. The plates 12 and 13, the separator 14, and the sleeves 15 and 16 are thereby held tightly in the casing 11 in relatively fixed relation therewith.

Each chamber C receives a rotating ring assembly 18 clamped on the shaft S which passes freely through the central portion of the casing and freely through the end plates 12 and 13 and the separator 14. As shown in Figure 1, the end plate 12 has a hole 12a therethrough, the end plate 13 has a similar hole 13a therethrough, and the separator has an even larger diameter hole 14a therethrough. Each of these holes is appreciably larger than the diameter of the shaft S, so that the shaft does not contact the plates or separator.

Each rotating ring assembly 18 includes a pair of outer split carbon packing rings 19 and 20, a pair of inner carbon split sealing rings 21 and 22, a central metal spring ring 23, and a clamping band or sleeve 24. The ends of the split rings are preferably inclined, so as to provide slanting gaps therebetween.

The packing ring 19 has a flat outer face confronting the adjacent flat inner face of the end plate 12. Likewise, the opposed packing ring 20 has a flat outer face confronting the adjacent flat face of the separator 14.

Figure 3:
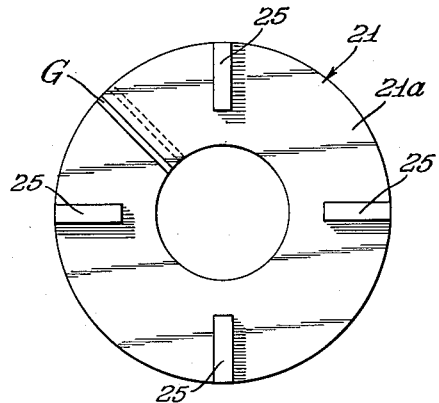
Figure 3 is a plan view of one carbon sealing ring used in the seal of this invention.
Figure 2:
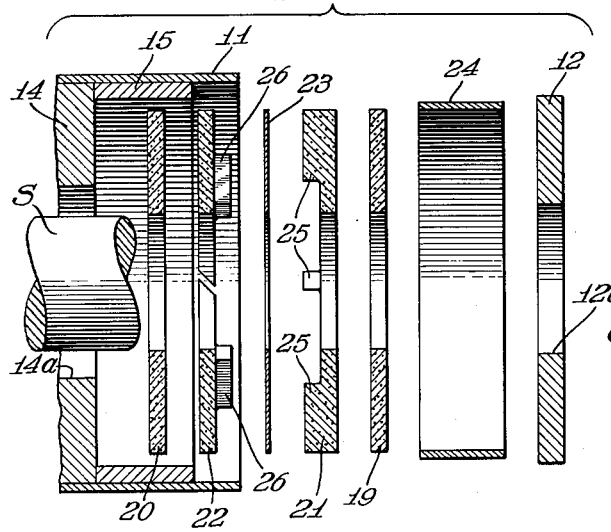
Figure 2 is a fragmentary longitudinal cross-sectional view showing the manner in which the parts of the seal are assembled and illustrating the parts in exploded relationship.
Figure 4:
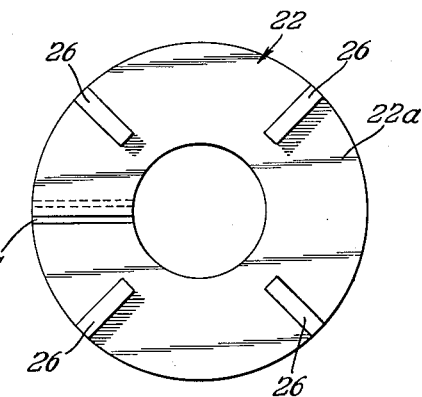
Figure 4 is a plan view of the other carbon sealing ring used in the seals of this invention.

The inner sealing ring 21 has a flat outer face confronting the flat inner face of the adjacent packing ring 19. Likewise, the sealing ring 22 has a flat outer face confronting the flat inner face of the adjacent packing ring 20. The inner faces of the sealing rings 21 and 22, however, are ribbed. Thus, as shown in Figure 3, the inner face 21a of the sealing ring 21 has four equally spaced radial ribs 25 extending inwardly from the outer periphery thereof into spaced relation from the hole through the center thereof. These ribs 25 are illustrated on the vertical and horizontal diameters of the rings. As shown in Figure 4, on the other hand, the inner face 22a of the other sealing ring 22 has four equally spaced radial ribs 26 extending inwardly from the outer periphery of the ring into spaced relation from the hole through the center of the ring but positioned on diameters which are at a 45° angle from the horizontal and vertical diameters. The ribs 26 therefore lie between the ribs 25 in the relative operating positions of the sealing rings 21 and 22.

As illustrated in Figure 1, the ribs 25 and 26 deflect the spring 23 into a fluted form, thereby stressing the ring and causing it to exert spring force as it tends to reclaim its original flat shape. This spring force is exerted in an axial direction to spread the rings 21 and 22 apart into sealing engagement with the packing rings 19 and 20. These packing rings, in turn, are resiliently urged apart to engage the adjacent faces of the stationary metal rings or plates 12 or 13, and 14. Each assembly 18 is thereby self contained to exert a spring loaded packing ring against a coacting sealing face.

The holes through the split carbon rings 19, 20, 21, and 22 are slightly larger than the diameter of the shaft S when the rings are in their free expanded condition with the gaps G thereof at their widest range. The sleeve 24, however, has an inside diameter smaller than the free outside diameter of the split carbon rings, so that when the sleeve is slipped over the carbon rings, the rings are contracted and the gaps G thereof are reduced in width. The contracted rings will frictionally grip the shaft S to rotate with the shaft and the amount of gripping action can be varied as desired to cause the carbon rings to be fixedly united to the shaft, or to have some slipping action on the shaft. In either event, however, the rings will sealingly engage the shaft.

As best shown in Figure 1, the gaps G of the split rings are preferably misaligned so that leakage paths are not created through these gaps. Lubricant can be introduced into the chamber C and between the ribbed rings 21 and 22 at the time of assembling the seal to provide a prelubricated arrangement. None of the parts of the seal are damaged by lubricant.

The spring load of the deflected spring ring 23 is sufficient to cause the rings 19 and 20 to maintain good sealing engagement with the stationary metal rings even after wear develops, since this spring force will overcome the contracting force on the rings created by the sleeve 24. The relative velocity of the packing rings and the stationary rings can be controlled by balance of the force of the spring 23 and the contracting force of the sleeve 24, so that the packing rings can be caused to rotate in direct relation with the shaft or at a lower speed than the shaft.

The spring force of the fluted spring disk 23 is also effective to dampen out vibrations of the shaft. At the same time, however, the shaft can have axial end play without damaging the seal. The seal further accommodates appreciable misalignment of the parts without interfering with the sealing efficiency.

It will be understood that rib designs differing from those shown in Figures 3 and 4 can be used. In some instances, it may be desired to extend the ribs to the inner periphery of the sealing ring. Since the spring load is applied equally in opposite directions, there is no tendency for the seals of this invention to axially load the shaft on which they are mounted.

From the above descriptions it will be understood that the invention provides a seal of the relatively rotating metal and carbon ring type wherein a rotating carbon ring assembly is mounted on a shaft and operates between opposed stationary metal rings. The rotating ring assembly includes spring means which automatically and continually urge the carbon rings against the stationary rings.

It will be understood that modifications and variations may be effected without departing from the scope of the novel concepts of the present invention.

I claim as my invention:

1. A shaft seal comprising a casing, opposed metal rings snugly seated in said casing and having holes therethrough of materially larger diameter than the shaft to be sealed, split carbon packing rings in said casing between said metal rings and having holes sized for snugly engaging the shaft to be sealed, split carbon seal rings in said casing between said packing rings, said seal rings having radially extending ribs on adjacent faces thereof, a spring ring between the ribs of said seal rings and deformed by said ribs to urge the seal rings and packing rings axially apart, a sleeve surrounding said carbon rings and said spring ring to clamp the carbon rings on the shaft to be sealed, and said carbon rings being slidable in said sleeve under the action of the spring ring to maintain the packing rings in sealing engagement with the opposed metal rings in the casing.

2. In a seal assembly of the relatively rotating metal and carbon ring type, the improvement which comprises a rotating carbon ring unit including split carbon packing rings, a pair of split carbon sealing rings between said packing rings, a spring ring between said sealing rings, and a sleeve surrounding all of said rings to contract the split rings into sealing engagement on a shaft while permitting the spring ring to hold the sealing rings against the packing rings and to urge said packing rings axially apart for coaction with adjacent stationary rings.

3. A seal assembly comprising a pair of opposed stationary sealing rings, a rotating seal ring assembly between said opposed stationary sealing rings, said rotating seal assembly including outer split carbon packing rings, inner split carbon sealing rings between said packing rings, a spring ring between the sealing rings, and a sleeve contracting the split rings into engagement with a shaft, said spring ring being effective to slide said split rings axially in said sleeve for maintaining the sealing rings in sealing engagement with the packing rings and the packing rings in sealing engagement with the stationary rings.

4. A double shaft seal which comprises a casing, apertured end plates in said casing, an apertured central plate in said casing between said end plates, spacer sleeves in said casing between said central and end plates and coacting therewith defining a pair of chambers in the casing, a rotating seal ring assembly in each chamber, each seal assembly including split carbon packing rings, opposed inner split carbon sealing rings between said packing rings, ribs on adjacent faces of the inner carbon sealing rings, a metal spring ring between the ribs of the sealing rings, a clamping sleeve contracting the split rings into sealing engagement with a shaft to be sealed, and the spring ring being effective to urge both packing rings of each assembly thereof into axial rubbing sealing engagement with the adjacent faces of the respective central and end plates in the casing.

References Cited in the file of this patent

UNITED STATES PATENTS

| | | |
|---|---|---|
| 184,973 | Lash | Dec. 5, 1876 |
| 236,117 | Tripp | Dec. 28, 1880 |
| 500,899 | Holmes | July 4, 1893 |
| 784,785 | Getts | Mar. 14, 1905 |
| 872,366 | Ver Planck | Dec. 3, 1907 |
| 980,542 | Lovell | Jan. 3, 1911 |
| 2,264,902 | Hill | Dec. 2, 1941 |
| 2,306,146 | Wheeler | Dec. 22, 1942 |
| 2,393,779 | Hunter | Jan. 29, 1946 |
| 2,639,171 | Johnson | May 19, 1953 |

FOREIGN PATENTS

| | | |
|---|---|---|
| 34,133 | France | of 1929 |
| | (1st add. of 647,131) | |
| 149,278 | Germany | of 1904 |
| 949,836 | France | Mar. 7, 1949 |